(12) United States Patent
Ingham

(10) Patent No.: US 6,204,594 B1
(45) Date of Patent: Mar. 20, 2001

(54) SPARK PLUG WITH PRESSURE SENSOR

(75) Inventor: Robert S. Ingham, Toledo, OH (US)

(73) Assignee: Cooper Automotive Products, Inc., Houston, TX (US)

( * ) Notice: Subject to any disclaimer, the term of this patent is extended or adjusted under 35 U.S.C. 154(b) by 0 days.

(21) Appl. No.: 09/096,182

(22) Filed: Jun. 12, 1998

(51) Int. Cl.⁷ .................................................. H01T 13/20
(52) U.S. Cl. ...................... 313/141 X; 313/140; 313/118
(58) Field of Search .................... 313/118, 119, 313/120, 128, 141, 143, 142, 140; 73/115; 123/143 C

(56) References Cited

U.S. PATENT DOCUMENTS

| | | |
|---|---|---|
| 2,642,054 | 6/1953 | Wright .................................. 123/169 |
| 3,389,287 | 6/1968 | Wolcot .................................. 313/125 |
| 4,476,412 | 10/1984 | Nishida et al. ...................... 313/130 |
| 4,489,596 | 12/1984 | Linder et al. ........................... 73/115 |
| 4,620,438 | 11/1986 | Howng ..................................... 73/35 |
| 4,686,861 | 8/1987 | Morii ..................................... 73/862 |
| 4,870,319 | 9/1989 | Nenedikt et al. ..................... 313/137 |
| 4,969,353 | 11/1990 | Steinke .................................. 73/115 |
| 5,247,171 | 9/1993 | Wlodarczyk et al. .......... 250/227.21 |
| 5,275,053 | 1/1994 | Wlodarczyk et al. ................. 73/705 |
| 5,385,053 | 1/1995 | Wlodarczyk et al. ................. 73/705 |
| 5,390,546 | 2/1995 | Wlodarczyk ........................... 73/715 |
| 5,955,826 | * 9/1999 | Suzuki et al. ........................ 313/119 |

FOREIGN PATENT DOCUMENTS

| | | |
|---|---|---|
| 441 157 A2 | 8/1991 | (EP) . |
| 97/31251 | 8/1997 | (WO) . |
| WO 97/31251 | 8/1997 | (WO) . |

OTHER PUBLICATIONS

R.H. Kuratle, "Measuring Spark Plugs with Integrated Cylinder Pressure Sensor", Piezo–Instrumentation Kistler IMechE 1993, C465/019/93, pp. 1–8 (no month).

(List continued on next page.)

Primary Examiner—Ashok Patel
Assistant Examiner—Joseph Williams
(74) Attorney, Agent, or Firm—Reising, Ethington, Barnes, Kisselle, Learman & McCulloch, P.C.

(57) ABSTRACT

A spark plug is installed in an internal combustion engine to monitor engine performance. The spark plug includes an outer shell having a central longitudinal axis and defining a first bore extending along the central longitudinal axis. The outer shell also includes a second bore that is offset from the central longitudinal axis. An insulative core is positioned in the first bore and defines a third bore concentric with the first bore. A first electrode is positioned in and has a firing end extending beyond the third bore. A second electrode including a firing surface is located adjacent to the firing end of the first electrode. A sensor is located within the third bore.

15 Claims, 3 Drawing Sheets

OTHER PUBLICATIONS

Gang He, et al., "Evaluation of a Spark–Plug–Integrated Fiber–Optic Combustion Pressure Sensor", Sae Technical Paper Series, Feb. 28–Mar. 3, 1994, 940381, pp. 207–214 (no month).

Gang He, et al., "Low–Cost Spark Plug–Integrated Fiber Optic Sensor for Combustion Pressure Monitoring", Sae Technical Paper Series, Mar. 1–5, 1993, 930853, pp. 1–10 (no month).

M.T. Wlodarcyzk, et al., "A Fiber–Optic Combustion Pressure Sensor System for Automotive Engine Control", Sensors, 1994, Technotes, pp. 35–42 (no month).

Gang He, et al., "Laboratory and In–Vehicle Evaluation of Fiber Optic Combustion Pressure Sensor", SPIE93, 1993, pp. 1–10 (no month).

Gang He, et al., "Tapered Fiber–Based Diaphragm–Type Pressure Sensor", SPIE 1993, pp, 1–8 (no month).

Patent Abstracts of Japan, 09260024, (Oct. 3, 1997).

Gang He, et al., Fiber–optic Sensor Employing Thin–film–coating Optical Spectrum Modulation Optics Letters, vol. 18, No. 13, Jul. 1, 1993, pp. 1113–1115.

Gang He, et al., "Catheter–type Disposable Fiber Optic Pressure Transducer", presented at 9th Int'l Conf. Optical Fiber Sensors, Italy, May 1993, pp. 1–4.

K. Kunberger; "Measuring Spark Plugs With Integrated Cylinder Pressure Sensor", Distrib & Gas Turbine World–wide, Sep. 1994, p. 42.

R.A. Wolthuis, et al.; "Development of Medical Pressure and Temperature Sensors Employing Optical Spectrum Modulation", IEEE Transactions on Biomedical Engineering, vol. 38, No. 10, Oct. 1991, pp. 974–981.

* cited by examiner

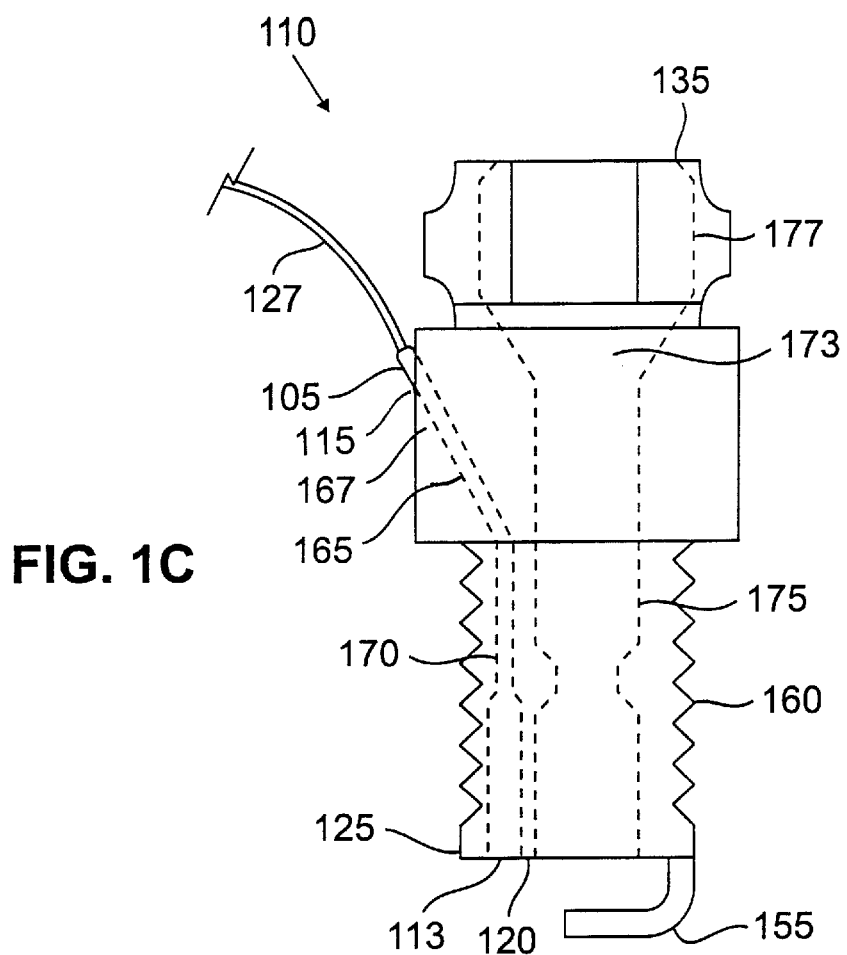
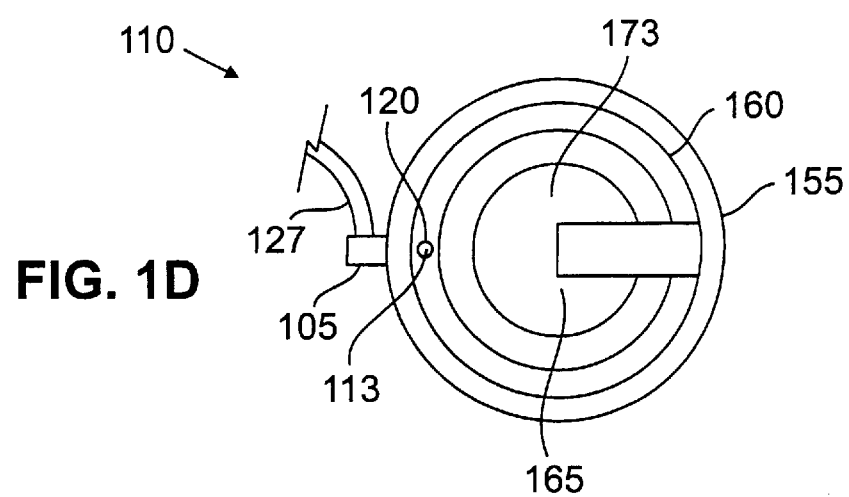

SPARK PLUG WITH PRESSURE SENSOR

TECHNICAL FIELD

The invention relates to spark plugs, and, more particularly, to spark plugs having pressure sensors.

BACKGROUND

Pressure sensors have been placed in various locations relative to the cylinder chambers of internal combustion engines to monitor the pressures in the chambers during operation. For example, a shielded piezo-electric pressure sensor probe has been installed in a hole bored in the cylinder head for the purpose of holding the pressure sensor probe.

Sensors also have been integrated into spark plugs as an alternative to drilling holes in the cylinder head. For example, Lindner, U.S. Pat. No. 4,489,596, describes a spark plug arrangement having plates positioned within the spark plug. The plates include different types of sensors, such as a pressure sensor, a temperature sensor, and a gas composition sensor. Similarly, Steinke, U.S. Pat. No. 4,969,353, describes a spark plug having a bore extending through an outer portion of the spark plug so that a pressure sensor may be located within the bore. The central electrode is positioned nonconcentrically in the outer portion to provide space for accommodating the sensors.

Wlodarczyk, PCT Application No. PCT/US96/04637, describes a spark plug having a bore extending through an outer portion of the spark plug and containing a fiber optic diaphragm sensor. The diaphragm sensor may be exposed directly to the combustion gases within the engine cylinder.

SUMMARY

The invention provides a simple and economical way of monitoring the internal pressure of an engine cylinder.

In one general aspect, the invention features a spark plug having a sensor in an outer shell. The outer shell has a central longitudinal axis and defines a first bore extending along the central longitudinal axis and a second bore offset from the central longitudinal axis. The sensor is located in the second bore. An insulative core is positioned in the first bore and defines a third bore concentric with the first bore. A firing electrode is positioned in and has a firing end extending beyond the third bore. A ground electrode that includes a firing surface is located adjacent to the firing end of the first electrode.

Embodiments may include one or more of the following features. For example, the second bore may include a first section terminating at a first opening and a second section connected to the first section and terminating at a second opening. The first and second sections may connect at an angle less than 180°. The first opening may be located adjacent to an end of a threaded section of the outer shell and the second opening may be located adjacent to an opposite end of the threaded section of the outer shell. The second bore may have an opening adjacent to a firing end of the spark plug. The sensor may be configured to measure pressure.

Performance of a combustion engine may be monitored by installing the spark plug in a combustion cylinder of the engine. The sensor then is connected to a monitoring circuit, and the output of the monitoring circuit is monitored. For example, the output may be a display of pressure in the combustion cylinder.

Other features and advantages will be apparent from the following description, including the drawings, and from the claims.

DESCRIPTION OF THE DRAWINGS

FIG. 1C is a side view of the outer shell of FIG. 1A.

FIG. 1D is a bottom view of the outer shell of FIG. 1C.

DESCRIPTION

Figure 1A:
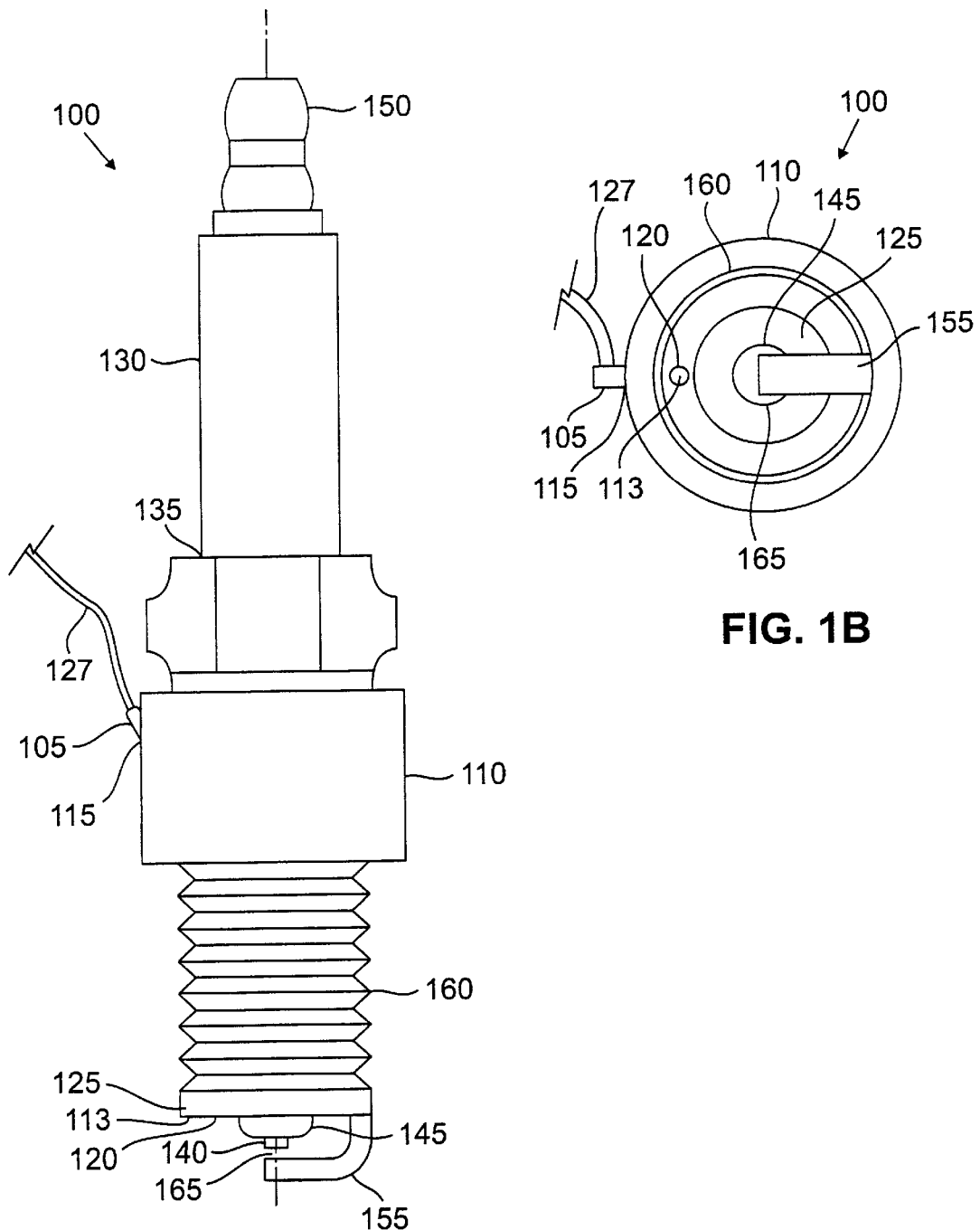
FIG. 1A is a side view of a spark plug having a pressure sensor in the outer shell.
Figure 1B:
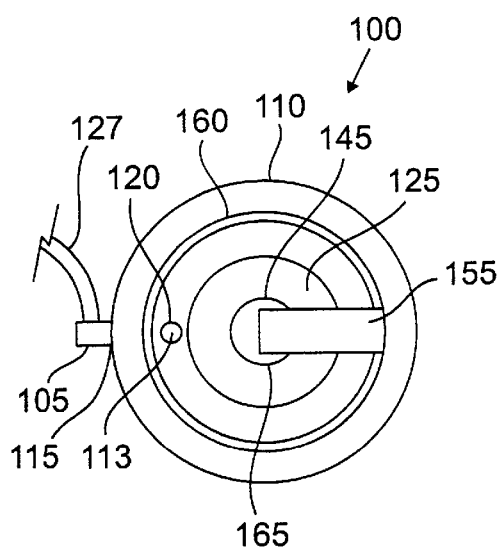
FIG. 1B is a bottom view of the spark plug of FIG. 1A.

Referring to FIGS. 1A and 1B, a spark plug 100 includes a pressure sensor 105 located within an outer shell 110 of spark plug 100. Pressure sensor 105 includes a sensing end 113 and is located between a pair of openings 115 and 120. Sensing end 113 is located in opening 120, which is at a firing end 125 of spark plug 100. A wire 127 connected to pressure sensor 105 extends from opening 115 for connection to a gauge or indicating means (not shown).

Spark plug 100 also includes an insulative core 130 located within an opening 135 of outer shell 110. Insulative core 130 includes a center firing electrode 140, an insulative core nose 145, and a male terminal 150. Outer shell 110 additionally includes a ground electrode 155 that is adjacent to a threaded section 160. Ground electrode 155 may be in various sizes and shapes, such as an L-shaped pin. A spark gap 165 is defined between ground electrode 155 and center firing electrode 140.

Spark plug 100 is threadably mounted in the engine (not shown) via the threaded portion 160 of the outer shell 110. When spark plug 100 is placed in the engine, opening 120 and sensing end 113 are located in the combustion chamber of an engine cylinder. Because sensor 105 terminates at opening 120, with sensing end 113 located at the opening 120, sensor 105 can measure conditions within the combustion chamber. The direct exposure of sensing end 113 to the combustion chamber eliminates Hemholtz frequencies that may be associated with remotely measuring pressure through a bore terminating in the combustion chamber. Other implementations may include sensors for measuring other parameters of engine performance, such as temperature sensors, gas composition sensors, or other sensors. These sensors may be used instead of, or in addition to, the pressure sensors.

Referring to FIGS. 1C and 1D, outer shell 110 includes a first bore 166 that passes between openings 115 and 120. Opening 115 is at one end of a narrow length 167 of bore 166 and opening 120 is at one end of a wider length 170 of bore 166. Narrow length 167 and wider length 170 define an oblique angle. Pressure sensor 105 is placed within bore 166 and runs the length of bore 166, between openings 115 and 120. A central bore 173 passes concentrically through outer shell 110 and includes a narrow length 175 and a wider length 177 into which insulative core 130 is placed.

Figure 1E:
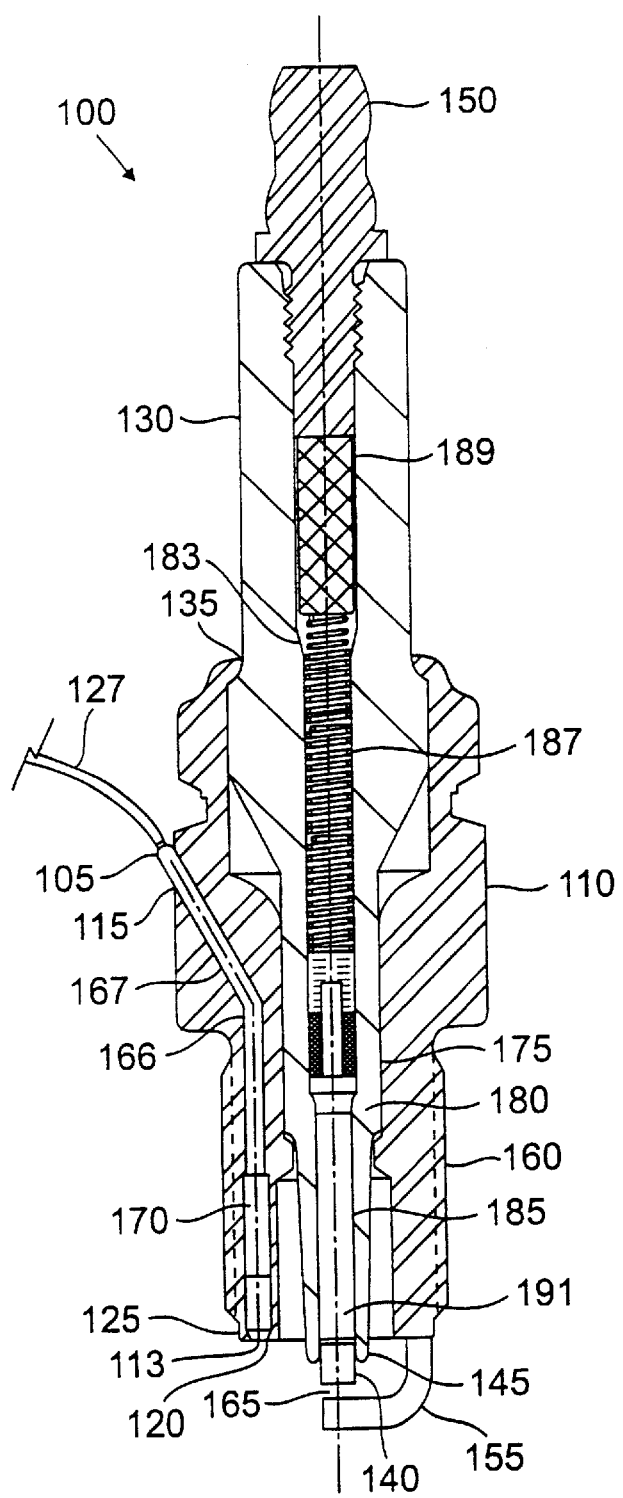
FIG. 1E is a cross-sectional view of the spark plug of FIG. 1A.

FIG. 1E illustrates the cross-section of spark plug 100. Insulative core 130 is concentrically positioned within outer shell 110 through opening 135 of central bore 173. The core 130 includes a narrow length 180 that fits within a narrower length 175 of central bore 173 and extends to the firing end 125. A concentric channel 183 within core 130 includes a narrower length 185 that corresponds to the narrow length 180 of core 130 and a first, wider length 187. Adjacent to the first, wider length 187 is a second, wider length 189. Core 130 is made from an insulating material.

A conduction path 191 runs the length of channel 183 and connects center firing electrode 140 to male terminal 150.

The conduction path 191 between center firing electrode 140 and male terminal 150 is created using well known structures that may include a combination of straight and coiled wire running the length of channel 183. The wire used in the conduction path is made from a material having suitable thermal and conductive properties. A spark plug wire (not shown) is attached to male terminal 150 and conducts electricity from an ignition system through the conduction path 191 to center firing electrode 140. The spark that initiates combustion in the cylinder chamber is formed in the gap 165 between ground electrode 155 and center firing electrode 140.

Materials and methods of manufacturing spark plugs are well known and are suitable for manufacturing a spark plug with a pressure measuring device. Nevertheless, some characteristics should be elaborated upon. For instance, sufficient thickness in shell 110 should be provided for passage of bore 166. To provide sufficient thickness, shell 110 may be manufactured with the outer dimensions of a 14 mm spark plug and the inner dimensions of a 10 mm spark plug. Also, a pressure transducer of suitable dimensions, and capable of withstanding temperatures that may approach 500° C. in the engine cylinder, should be used in the spark plug. For instance, a high sensitivity, ultraminiature pressure transducer manufactured by Kulite Semiconductor Products, Inc. of Leonia, N.J., as model Sensor XCE-062 may be used. For example, other types of pressure sensors (i.e., piezo-electric, piezo-resistive, piezo-capacitive) also may be used. The sensor 105 is placed in bore 166 and a seal is formed between sensor 105 and opening 115 with high temperature adhesive.

Other embodiments are within the scope of the following claims.

What is claimed is:

1. A spark plug comprising:
   an outer shell having a central longitudinal axis and defining both a first bore extending along the central longitudinal axis and a second bore that is located internally within the outer shell, the second bore having an axis which is offset from the central longitudinal axis;
   an insulative core positioned in the first bore and defining a third bore concentric with the first bore;
   a first electrode positioned in and having a firing end extending beyond the third bore;
   a second electrode including a firing surface located adjacent to the firing end of the first electrode; and
   a sensor located within the second bore.

2. The spark plug of claim 1, wherein the second bore includes a first section terminating at a first opening and a second section connected to the first section and terminating at a second opening.

3. The spark plug of claim 2, wherein the first and second sections connect at an angle of less than 180°.

4. The spark plug of claim 2, wherein the first opening is located adjacent to an end of a threaded section of the outer shell and the second opening is located adjacent to an opposite end of the threaded section of the outer shell.

5. The spark plug of claim 1, wherein the second bore has an opening adjacent to a firing end of the spark plug.

6. The spark plug of claim 5, wherein the sensor is located within the second bore at the opening, whereby, when the spark plug is installed in a combustion chamber of an engine, the sensor is capable of directly measuring conditions within the combustion chamber.

7. The spark plug of claim 1, wherein the sensor comprises a pressure sensor.

8. The spark plug of claim 1, wherein the second bore extends from a first opening located at a middle region of the spark plug to a second opening located at a firing end of the spark plug, and wherein the second bore has a larger diameter at the second opening than at the first opening.

9. The spark plug of claim 8, wherein the sensor has an end portion having a larger diameter than the diameter of the second bore at the first opening.

10. A method of installing a spark plug into a combustion engine to permit monitoring of the engine's performance, the method comprising:
    mounting a spark plug with a sensor in a combustion cylinder of the engine, wherein the spark plug is comprised of an outer shell, an insulative core, first and second electrodes, and a sensor, the outer shell having a central longitudinal axis and defining both a first bore extending along the central longitudinal axis and a second bore that is located internally within the outer shell, the second bore having an axis which is offset from the central longitudinal axis, the insulative core being positioned in the first bore and defining a third bore concentric with the first bore, the first electrode positioned in and having a firing and extending beyond the third bore, the second electrode including a firing surface located adjacent to the firing end of the first electrode, and the sensor located within the second bore; and
    connecting the sensor to a monitoring circuit.

11. The method of claim 10, wherein the second bore includes a first section terminating at a first opening and a second section connected to the first section and terminating at a second opening.

12. The method of claim 11, wherein the first and second sections connect at an angle of less than 180°.

13. The method of claim 11, wherein the first opening is located adjacent to an end of a threaded section of the outer shell and the second opening is located adjacent to an opposite end of the threaded section of the outer shell.

14. The method of claim 10, wherein the second bore has an opening adjacent to a firing end of the spark plug.

15. The method of claim 10, wherein the sensor comprises a pressure sensor.

* * * * *